(No Model.)
J. I. CARUTHERS.
SAW.
No. 604,603. Patented May 24, 1898.
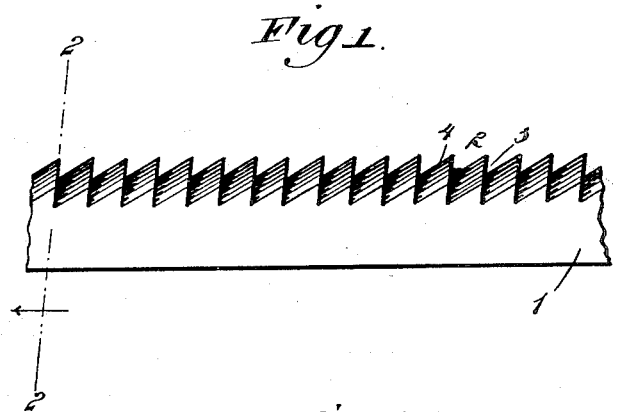
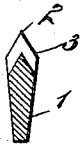
WITNESSES:
INVENTOR
J. I. Caruthers.
BY
ATTORNEYS.

UNITED STATES PATENT OFFICE.

JOHN I. CARUTHERS, OF INGLESIDE, TEXAS.

SAW.

SPECIFICATION forming part of Letters Patent No. 604,603, dated May 24, 1898.

Application filed August 12, 1897. Serial No. 647,979. (No model.)

*To all whom it may concern:*

Be it known that I, JOHN I. CARUTHERS, of Ingleside, in the county of San Patricio and State of Texas, have invented new and useful Improvements in Saws, of which the following is a full, clear, and exact description.

This invention relates particularly to hacksaws; and the object is to provide a saw of this class with the teeth so arranged as to cut during both the back and forth movements and also so arranged as to effectually clear the kerf of sawdust. I particularly dwell on the sloping manner in which the teeth enter the substance to be cut.

I will describe a saw embodying my invention, and then point out the novel features in the appended claim.

Reference is to be had to the accompanying drawings, forming a part of this specification, in which similar characters of reference indicate corresponding parts in both the figures.

Figure 1 is a side elevation of a saw embodying my invention, and Fig. 2 is a section on the line 2 2 of Fig. 1.

Referring to the drawings, 1 designates the saw-blade, and 2 designates the teeth. The front sides of the teeth are arranged at a slight angle relatively to the blade, as indicated at 3, and the rear sides 4 are arranged at a greater incline. The teeth are beveled outward from their longitudinal centers, and thus sharp cutting edges and points are provided, and the inner end of the edge of a tooth engages with and terminates at a point between the inner and outer ends of the front portion of an adjacent tooth.

A saw made in accordance with my invention will run with great smoothness and freedom from jar.

Having thus described my invention, I claim as new and desire to secure by Letters Patent—

A saw having the front sides of its teeth arranged at a slight incline relatively to the blade and the rear sides arranged at a greater incline, the said teeth being beveled outward from their longitudinal centers, the inner end of a tooth engaging with and terminating at a point between the inner and outer ends of the front portion of an adjacent tooth, substantially as specified.

JOHN I. CARUTHERS.

Witnesses:
   H. W. MORGAN,
   J. G. HATCH.